UNITED STATES PATENT OFFICE.

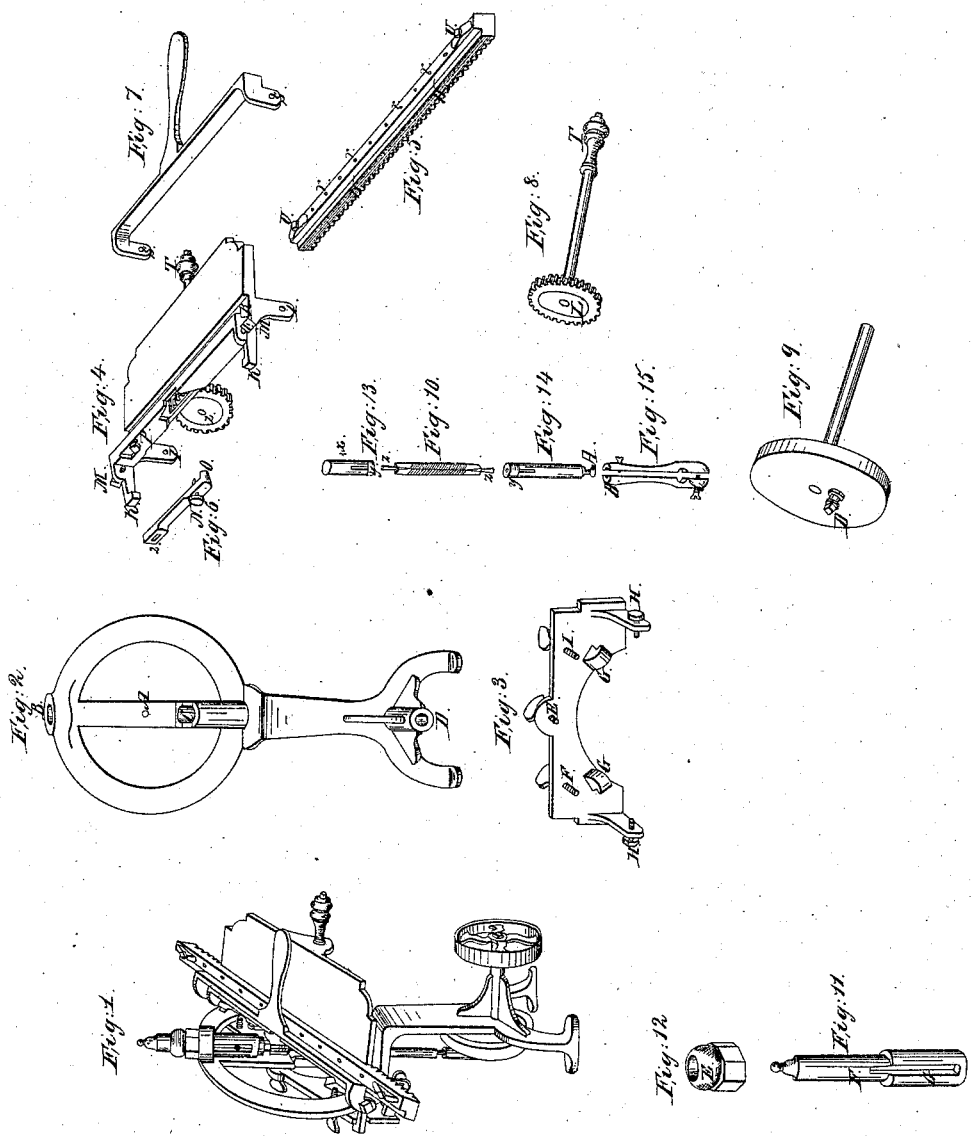

ALVAH SWEETLAND, OF SYRACUSE, NEW YORK.

IMPROVEMENT IN SAW-FILING MACHINES.

Specification forming part of Letters Patent No. 58,151, dated September 18, 1866.

*To all whom it may concern:*

Be it known that I, ALVAH SWEETLAND, of the city of Syracuse, in the county of Onondaga and State of New York, have invented a new and useful Improvement on a Machine for Filing Saws; and I do hereby declare that the following is a full, clear, and exact description of the construction and operation of the same, reference being had to the annexed drawings, making a part of this specification, in which—

Figure 1 is a perspective view. Fig. 2 is a perspective view of the frame of the machine; Fig. 3, a swing-bar; Fig. 4, an adjustable table; Fig. 5, a rag; Fig. 6, a dog that drops between the teeth and assists in holding the saw while filing; Fig. 7, a lever to hold the saw firm while filing; Fig. 8, a rag-wheel; Fig. 9, a balance-wheel; Fig. 10, a straight file; Fig. 11, a cylinder to hold the clasp, Fig. 13; Fig. 12, a nut; Fig. 13, a clasp for holding the upper end of the file; Fig. 14, a clasp for holding the lower end of the file; Fig. 15, a connecting-rod connecting the balance-wheel to the file.

Letter A in Fig. 2 is a hole to admit the thumb-screw E. Letter B in Fig. 2 is a hole to admit the clasp. Letter C in Fig. 2 is a hollow cylinder. Letter D in Fig. 2 is a box to receive the shaft of the balance-wheel. Letters G G in Fig. 3 are the hooks that attach the swing-bar to the frame. Letter E in Fig. 3 is the thumb-screw that holds the bar to the frame. Letters F F in Fig. 3 are set-screws to be used to determine the depth of the teeth of the saw. Letters H H in Fig. 3 are screws to fasten the swing-bar to the adjustable table. Letters K K in Fig. 4 are hooks to hold the adjustable table to the swing-bar. Letters M M in Fig. 4 are screws that fasten the lever to the adjustable table. Letter P in Fig. 4 is a set-screw to attach the dog to the adjustable table. Letter R in Fig. 4 is a groove to receive the rag. Letter Q in Fig. 4 is the rag-wheel. Letters I I in Fig. 4 are holes to receive the screws H H. Letter S in Fig. 4 is the handle of the rag-wheel. Letters W W in Fig. 5 is the dial on the rag. Letters U U in Fig. 5 are nuts and buttons to hold the saw. Letters V V V V V in Fig. 5 are holes to insert the nuts and buttons in, so as to hold any length of saw. Letter Q in Fig. 6 is a slot in the upper end of the dog. Letter N in Fig. 6 is a screw that works in the dial on the rag. Letter C in Fig. 6 is the point of the dog that drops in between the teeth of the saw. Letters S S in Fig. 7 are holes through which the screws M M in Fig. 4 play and fasten the lever to the adjustable table. Letter Q in Fig. 8 is the rag-wheel. Letter D in Fig. 9 is a wrist that plays in the lower end of the connecting-rod in box *e*. Letters Z Z in Fig. 10 are the shanks of the file. Letter F in Fig. 11 is the upper part of the cylinder. Letter G in Fig. 11 is the slot in lower part of the cylinder. Letter E in Fig. 12 is the nut to screw on the top of the clasp. Letter Y in Fig. 13 is a nut. Letter X in Fig. 13 is a pin fastened to the clasp. Letter A in Fig. 14 is the lower end of the clasp. Letter Y in Fig. 14 is a nut on the upper end of the clasp. Letter *e* in Fig. 15 is a box for wrist to play in. Letter B in Fig. 15 is a box in the upper end of the connecting-rod.

To enable others skilled in the art to make and use my invention, I will proceed to describe its construction and operation.

The upper portion of the frame is a circle, with a bar passing through the center. The bar is for the purpose of attaching to it the swing-bar. The circle is for the purpose of supporting the swing-bar. The lower part of the frame is a solid piece extending downward, as far as desired, to the floor. The swing-bar, as shown in the drawings, is attached to the frame by the screw E in the swing-bar in the hole A in the frame, and held firmly in whatever position desired. The spring-bar can be turned either way, so as to give the desired angle to the saw-teeth. The adjustable table is attached to the swing-bar on the opposite side of the frame to the swing-bar by screws H H in the swing-bar, through holes I I in the adjustable table, which, when so fastened, can be moved forward to give any required depth of tooth, and stopped by screws F F in the swing-bar. The adjustable table can drop back, and when it drops back it is held by hooks K K in the adjustable table. The rag is placed in the groove R in the adjustable table. The cogs of the rag play in the cogs of the rag-wheel. The dog is fastened to the adjustable table by a set-screw, letter P, in adjustable table, which drops between the teeth of the saw, and holds the saw in its place, and operates as a gage while filing the saw. The pivot N in the dog works in the index W W on the rag, and is used to give the teeth uniform size. The lever is attached to the adjustable table by hinge-screws M M in holes S S in the lever, and is used to hold the saw firm while filing. The rag-wheel is attached to the adjustable table by hangers, as represented in Fig. 1. Said rag-wheel has a handle on one end, used to move the rag that carries the saw. The balance-wheel is attached to the frame by a shaft passing through hole D in the frame, giving motion to the file. The straight file has a shank at each end, and tapering inwardly, and is attached at one end to the upper clasp, and at the other end to the lower clasp, and held firm by means of nuts Y Y. The cylinder is attached to the frame through hole B, and held to its position by the nut, Fig. 12. It is used for the purpose of guiding the upper clasp, and can be turned either way, so as to give, while filing, a proper bevel to the saw-teeth. The nut is fastened to the cylinder at letter F. The upper clasp is placed inside of the cylinder. The pivot on the upper clasp plays in and projects out of the slot of the cylinder at G. The lower clasp, one end of it, is fastened in the upper end of the connecting-rod at B. The upper end of said clasp is fastened to the lower shank of the file. The connecting-rod is attached to the wrist at D in the balance-wheel.

When the machine is intended to be used the saw is placed on the rag, and fastened at either end by the buttons. By turning the rag-wheel by its handle it moves the saw as required. The balance-wheel is set in motion by hand, or any other motive power, and when the balance-wheel is in motion it causes the file to play perpendicularly against the saw-tooth, and by turning the handle of the rag-wheel the file operates on the teeth of the whole saw.

What I claim as my invention, and desire to secure by Letters Patent, is—

The swing-bar, the adjustable table, the rag, the dog, the lever, the rag-wheel, the straight file, the cylinder, the clasps, and the connecting-rod, the whole being arranged and combined substantially as and for the purposes set forth.

ALVAH SWEETLAND.

Witnesses:
B. D. NIXON,
L. F. SMITH.